United States Patent
Ritter et al.

(10) Patent No.: US 6,634,487 B2
(45) Date of Patent: Oct. 21, 2003

(54) CONVEYING APPARATUS FOR FORMING AND LOADING GROUPS OF CONTAINERS

(75) Inventors: Raimund Ritter, Tengen (DE); Alexander Frank, Neuhausen am Rheinfall (CH)

(73) Assignee: SIG Pack Systems AG (CH)

( * ) Notice: Subject to any disclaimer, the term of this patent is extended or adjusted under 35 U.S.C. 154(b) by 10 days.

(21) Appl. No.: 10/013,870

(22) Filed: Dec. 11, 2001

(65) Prior Publication Data

US 2002/0070097 A1 Jun. 13, 2002

(30) Foreign Application Priority Data

Dec. 13, 2000 (CH) .............................................. 2435/00

(51) Int. Cl.$^7$ .............................................. B65G 19/00
(52) U.S. Cl. ....................................................... 198/726
(58) Field of Search ......................................... 198/726

(56) References Cited

U.S. PATENT DOCUMENTS

| | | | | |
|---|---|---|---|---|
| 898,250 A | * | 9/1908 | Mitchell ..................... | 493/163 |
| 1,840,410 A | | 1/1932 | Robinson | |
| 2,840,224 A | * | 6/1958 | Lefief ....................... | 198/461.1 |
| 3,325,977 A | * | 6/1967 | Kristen ........................ | 53/250 |
| 3,452,855 A | * | 7/1969 | Baker ........................ | 198/461.1 |
| 5,143,204 A | * | 9/1992 | Owen et al. ................ | 198/726 |
| 5,823,318 A | * | 10/1998 | Baur et al. ................. | 198/699.1 |
| 5,937,620 A | | 8/1999 | Chalendar | |
| 6,497,320 B2 | * | 12/2002 | Kondo et al. ............ | 198/502.3 |

FOREIGN PATENT DOCUMENTS

| | | |
|---|---|---|
| DE | 41 14 553 A1 | 11/1992 |
| WO | WO 96/41760 | 12/1996 |

OTHER PUBLICATIONS

European Search Report.

* cited by examiner

*Primary Examiner*—Christopher P. Ellis
*Assistant Examiner*—Richard Ridley
(74) *Attorney, Agent, or Firm*—Harness, Dickey & Pierce, P.L.C.

(57) ABSTRACT

The apparatus has two pairs (16, 17) of conveying elements which are arranged laterally spaced from each other. Each pair (16, 17) has two parallel conveying elements (18, 19, 20, 21) arranged one above the other. All of the conveying elements (18 to 21) are guided via a respective driving wheel (22 to 25) and a deflecting wheel (26 to 29). They are, for example, toothed belts from which drivers (34, 35) protrude at a regular, adjustable spacing just over part of their length. A first driving unit (30, 31) drives one of the driving wheels (22, 23) of each pair (16, 17) of conveying elements in synchronism. A second driving unit (32, 33) drives the two other driving wheels (24, 25) in each case in synchronism. A control device is connected to the driving units. The apparatus enables containers to be transported from an input station (4) in groups to a loading station (8), in which they are made ready in a precise position and are filled.

11 Claims, 3 Drawing Sheets

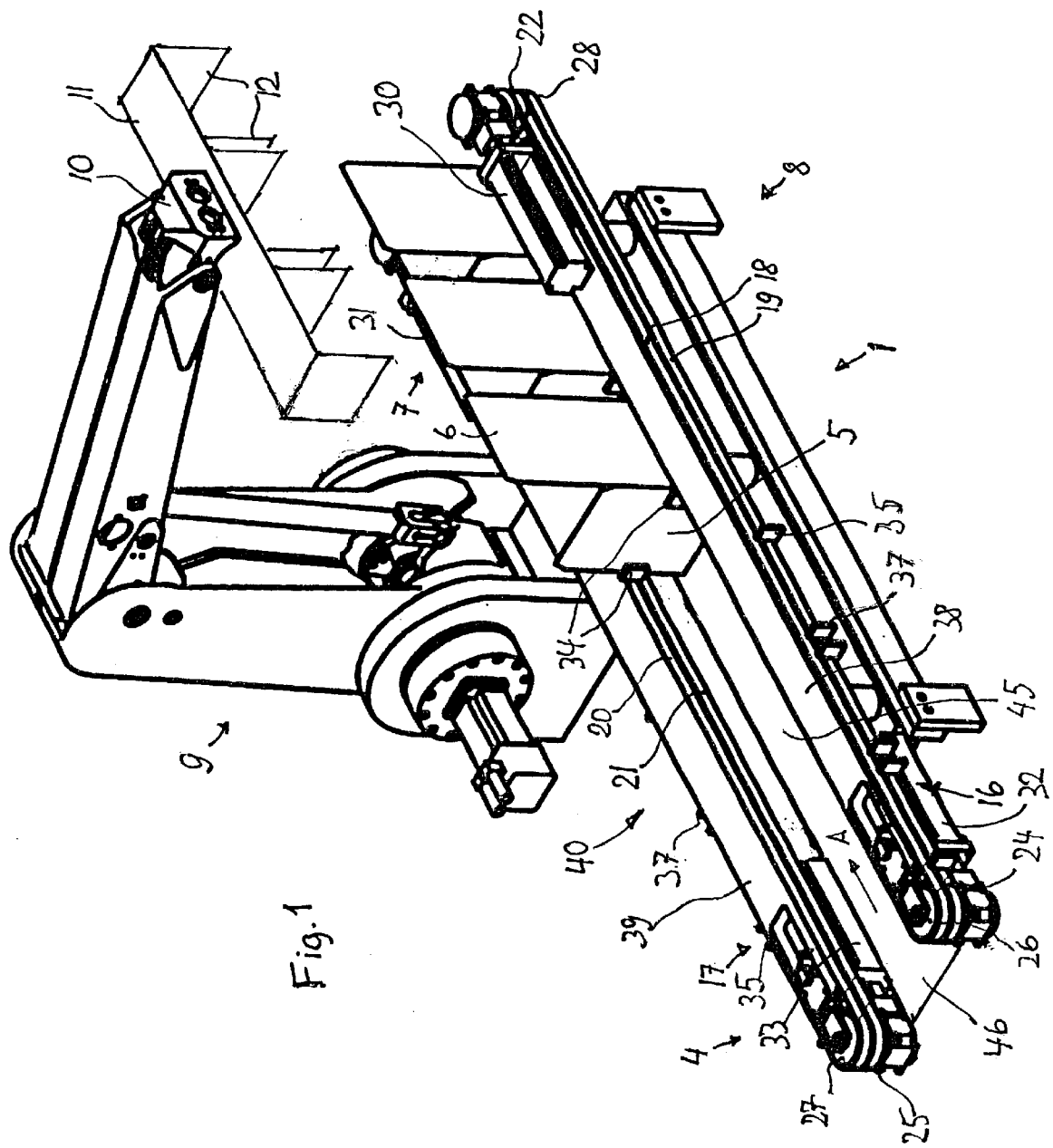

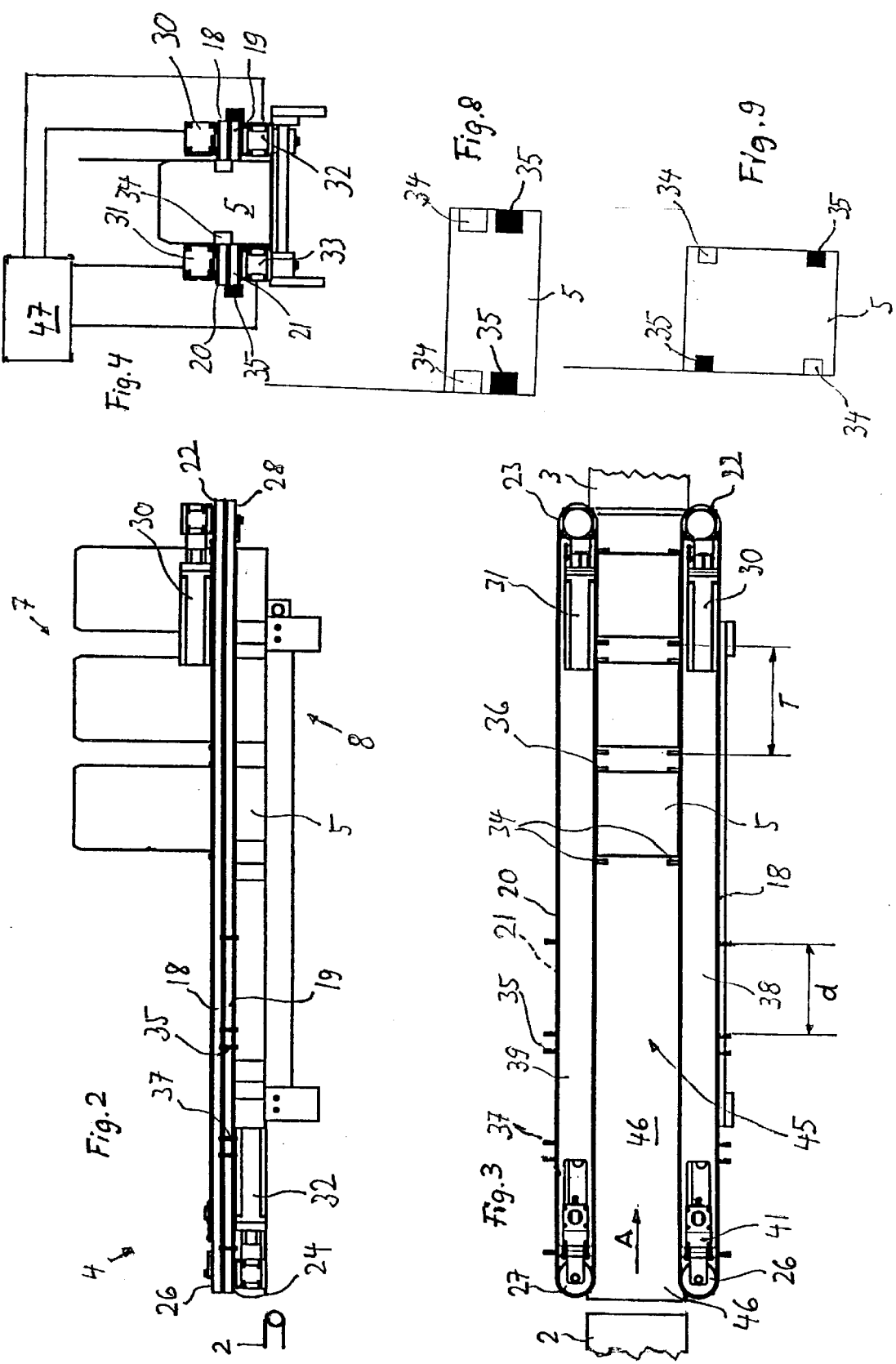

__US 6,634,487 B2__

CONVEYING APPARATUS FOR FORMING AND LOADING GROUPS OF CONTAINERS

FIELD OF THE INVENTION

WO 96/41760 discloses a conveying apparatus for products which are provided in lumps. Said apparatus comprises two parallel, endless conveying chains which are driven via separate motors. Drivers protrude from the conveying chains at regular distances over just part of their length.

BACKGROUND OF THE INVENTION

U.S. Pat. No. 5,937,620 describes a further conveying apparatus. Said apparatus is used for conveying and filling boxes with a group of cans. The apparatus has two endless conveying chains which circulate in a vertical plane about a respective driving wheel and a deflecting wheel and from which drivers protrude at a regular distance. The drivers push the boxes in front of them. In operation, the two chains are driven in synchronism. In order to be able to adapt the apparatus to other lengths of box, one driving wheel can be rotated at an angle with respect to the other.

SUMMARY OF THE INVENTION

It is an object of the invention to specify an apparatus with which containers can be transported from an input station in groups to a loading station, in which they are made ready in a precise position and are filled. This object is achieved by the features of the independent claims.

BRIEF DESCRIPTION OF THE DRAWING

An exemplary embodiment of the invention will be explained below with reference to the drawings, in which FIG. 1 shows a perspective view, FIGS. 2–4 show a side view, plan view and end view of the apparatus.

DESCRIPTION OF THE PREFERRED EMBODIMENTS

Figure 5:
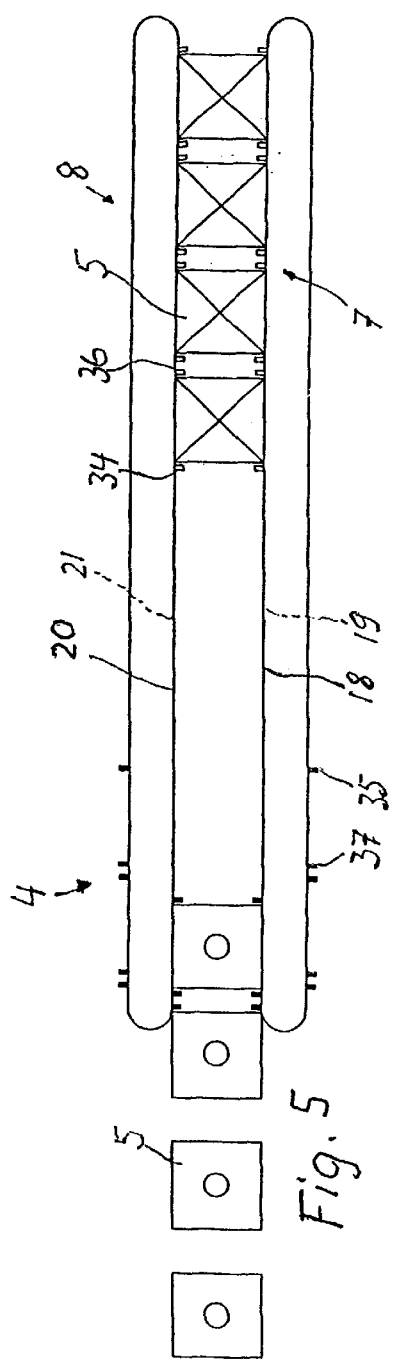
FIGS. 5–7 show schematic plan views in various operating positions, and FIGS. 8+9 show two different operating modes.

The apparatus 1 is arranged between a supply conveying belt 2 and a removal conveying belt 3 and has an input station 4, in which empty boxes 5 having an open lid 6 are pushed on by the belt 2. By means of the apparatus 1, a number of boxes 5 is transported as a group 7 to a loading station 8, in which the boxes 5 are filled in groups with products, for example in a number of layers, by means of a robot 9. Illustrated schematically on the robot head 10 is a gripping head 11 having three grippers 12 for simultaneously placing three products into the three boxes 5 of the group 7.

The conveying apparatus 1 has two pairs 16, 17 of conveying elements spaced laterally apart from one another. The lateral distance of the pairs 16, 17 from each other is adjustable, in order to be able to adapt the apparatus 1 to different box widths. Each pair 16, 17 has an upper endless conveying element 18, 20 and a lower endless conveying element 19, 21 parallel thereto, for example a chain or a toothed belt. All of the conveying elements 18 to 21 circulate about a respective driving wheel 22, 23, 24, 25 and a respective deflecting wheel 26, 27, 28, 29. Each driving wheel 22 to 25 is driven by a respective, separate AC servomotor 30, 31, 32, 33. Drivers 34, 35 and counter-holders 36, 37 protrude laterally to the outside from each conveying element 18 to 21 over part of its length, preferably over less than half of its length. The distance of the drivers 34 from each other, i.e. the spacing T, is adjustable, as is the distance d of the counter-holders 36, 37 from the drivers 34, 35, in order to be able to adapt the apparatus 1 to different lengths of the boxes 5. The conveying elements 18 to 21 can also be designed as toothed belts having fixed drivers 34, 35. When the spacing T and/or the distance d is changed, the entire toothed belt is then replaced by another toothed belt having a different, fixed spacing T and/or distance d.

In each case one conveying element 18 having drivers 34 and counter-holders 36, one driving wheel 22 having a motor 30 and one deflecting wheel 26 are mounted on a support 38, 39, which is in the form of a board, and therefore forms a constructional unit 40 or a module. The supports 38, 39 serve at the same time as guides for the conveying elements 18 to 21 along the working section 45. The deflecting wheels 26 to 29 are mounted on tensioners 41 which can be adjusted in the conveying direction A and are likewise parts of the modules 40. All of the modules 40 are of identical construction. As a result, the one motor 30 of the pair 16 of conveying elements is arranged in each case at one end of this pair 16 and the other motor 32 is arranged at the opposite end of the pair 16. The one motor 30 protrudes upward, the other protrudes downward. The modules 40 of one pair 16 are axially symmetrical with respect to a horizontal central line perpendicular with respect to the conveying direction A.

The boxes 5 slide along a sliding floor 46 along the working section 45 from the input station 4 to the loading station 8. The vertical distance of the sliding floor 46 from the pairs 16, 17 of conveying elements is adjustable, in order to be able to adapt the apparatus 1 to different heights of the containers 5, so that the drivers 34, 35 and counter-holders 36, 37 engage approximately level with the center of gravity of the boxes 5. Great accelerations and decelerations of the boxes 5 in the transporting direction A can therefore be achieved without any risk of tilting. For the same purpose, the vertical distance of the constructional units 40 of each pair 16, 17 of conveying elements from each other can also be adjustable, as is indicated in FIGS. 8 and 9. All of the motors 30 to 33 are connected to a common control device 47.

Figure 6:
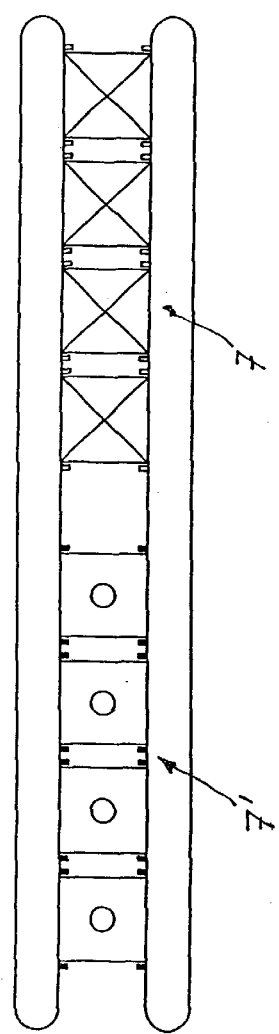
Figure 7:
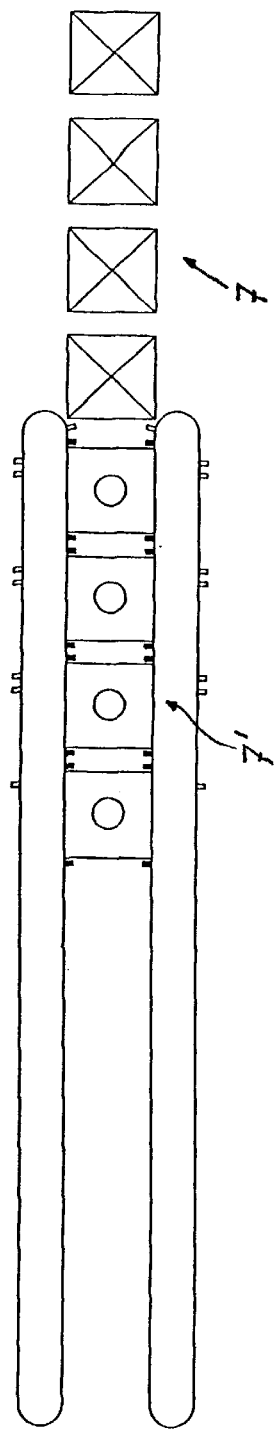

A possible manner of operating the apparatus will be described below with reference to the illustration according to FIGS. 5 to 7. The drivers 35 and counter-holders 37, which are filled out in black, of the lower, two conveying elements 19, 21 are aligned exactly with one another. The angles of rotation of the driving wheels 24, 25 are therefore synchronized exactly with each other, which is ensured by the control device 47. Similarly, the drivers 34 and counter-holders 36, which are illustrated merely by the outlines, of the two upper conveying elements 18, 20 are aligned with one another. In the input station 4, the lower driving wheels 24, 25 rotate continuously and the drivers 35 drive along the empty boxes 5 delivered by the belt 2. At the same time, the group 7 of drivers 34 and counter-holders 36 of the upper conveying elements 18, 20 in the loading station 8 is at rest and the boxes 5 of the group 7 which have been precisely positioned by them are loaded by the robot 9. As soon as the lower drivers 36 have grasped a predetermined number of boxes 5 (four in the example illustrated), the motors 32, 33 accelerate until the front-most counter-holder 37 arrives in the vicinity of the loading station 8, in which case the motors 32, 33 stop if the loading process has not yet ended. After the loading process has ended, the upper drivers 34 push the filled boxes 5 out onto the conveying belt 3 and return at high speed to the input station 4, where they are again supplied at relatively low speed by the conveying belt 2. At the same time, the next group 7, which has been positioned exactly in the loading station 8 by the lower drivers 35, is loaded.

The described apparatus is very flexible and can be adapted in a simple manner to different formats of boxes 5 in all three dimensions. In the loading station 8, the boxes 5 are positioned very exactly by the drivers 34, 35 and counter-holders 36, 37. Between the end of the filling process and the making ready of an empty box group 7 in the loading station 8 there passes scarcely any more time than the robot 9 requires in any case in order to grasp the new group of products. The filling speed is therefore restricted virtually only by the possible cycle frequency of the robot 9, which makes a high output possible.

Departing from the embodiment illustrated, the driving wheels 22, 23 and 24, 25, which are in each case driven synchronously with one another, can also be coupled via a gear connection and can be driven by just one driving motor. However, the embodiment illustrated is preferred because it is more flexible and, for example, also enables the manner of operation which is illustrated in FIG. 9, in which the motors 30 and 33, and 31 and 32 are in each case synchronized with one another, with the result that the interacting drivers 35 and 34 engage approximately on a diagonal of the boxes 5, in the end view. This may be of advantage in the case of tall boxes 5, so that the connecting line between interacting drivers 34 and 35 approximately intersects a straight line which is parallel to the conveying direction A and passes through the center of gravity of the boxes 5. As a result, very rapid accelerations and decelerations of the boxes 5 can be achieved without any risk of tilting. The production costs are reduced by the modular construction. The module 40 can also be used for other transporting apparatuses, in which the drivers 34 are distributed over the entire length of the conveying element 18. This enables the production piece numbers to be further increased and the costs to be reduced.

What is claimed is:

1. A conveying apparatus having a feeding station in which a conveying section is supplied with containers, and a loading station, in which a group of containers is loaded, comprising:
   a first pair of conveying elements having an upper, first conveying element and a lower, second conveying element parallel thereto,
   a laterally spaced, parallel, second pair of conveying elements having an upper, third conveying element and a lower, fourth conveying element parallel thereto,
   all of said conveying elements being endless, flexible tension elements which circulate via a respective driving wheel and a deflecting wheel and from which drivers protrude at a regular spacing just over part of their length,
     a first driving unit which drives a first one of said driving wheels of each pair of conveying elements in synchronism,
     a second driving unit which drives a second one of said driving wheels of said pairs of conveying elements in synchronism, and
     a control device which is connected to said two driving units, wherein each driving unit comprises a first and a second motor, with the result that each driving wheel is driven by its own motor.

2. The apparatus as claimed in claim 1, said first motor on each pair of conveying elements being arranged in each case in the region of the input station and said second motor being arranged in the region of the loading station.

3. The apparatus as claimed in claim 2, said first motor on each pair of conveying elements being arranged above said pair of conveying elements and said second motor being arranged below said pair.

4. The apparatus as claimed in claim 1, the lateral distance between said two pairs of conveying elements being adjustable.

5. The apparatus as claimed in claim 1, said apparatus having, below said pairs of conveying elements, a sliding floor along which said containers are pushed, and the vertical distance of the sliding floor from said pairs of conveying elements being adjustable.

6. The apparatus as claimed in claim 1, wherein the vertical distance between each of said two conveying elements of each pair of conveying elements is adjustable.

7. A conveying apparatus comprising a first conveying element and a second conveying element circulating parallel thereto, said two conveying elements being flexible, endless tension elements which circulate via a respective driving wheel and a deflecting wheel and from which drivers protrude at a regular spacing just over part of their length, and said two driving wheels being connected to a respective motor, wherein said two driving wheels are arranged at opposite ends of said pair of conveying elements, wherein said two motors are arranged on opposite sides of the pair of conveying elements, and wherein the two units formed from a respective conveying element, a deflecting wheel, a driving wheel and a motor connected thereto, are designed as identical modules.

8. The pair of conveying elements as claimed in claim 7, each module being mounted on a separate support, and the distance of said supports from each other preferably being adjustable.

9. The pair of conveying elements as claimed in claim 7, each driver being assigned a counter-holder whose distance from the assigned driver can be adjusted irrespective of the spacing.

10. The new apparatus as claimed in claim 1, wherein, said second motor on each pair of conveying elements being arranged above said pair of conveying elements and said first motor being arranged below said pair.

11. A conveying apparatus having a feeding station, in which a conveying section is supplied with containers, and a loading station, in which a group of containers is loaded, comprising:
   a first pair of conveying elements having an upper, first conveying element and a lower, second conveying element parallel thereto,
   a laterally spaced, parallel, second pair of conveying elements having an upper, third conveying element and a lower, fourth conveying element parallel thereto,
   all of said conveying elements being endless, flexible tension elements which circulate via a respective driving wheel and a deflecting wheel and from which drivers protrude at a regular spacing just over part of their length,
     a first driving unit which drives a first one of said driving wheels of each pair of conveying elements in synchronism,
     a second driving unit which drives a second one of said driving wheels of said pairs of conveying elements in synchronism, and a control device which is connected to said two driving units, wherein said apparatus having, below said pairs of conveying elements, a sliding floor along which said containers are pushed, and the vertical distance of the sliding floor from said pairs of conveying elements being adjustable.

* * * * *